(12) United States Patent
Friesel et al.

(10) Patent No.: US 9,140,784 B1
(45) Date of Patent: Sep. 22, 2015

(54) BALLISTIC MISSILE DEBRIS MITIGATION

(71) Applicant: Lockheed Martin Corporation, Bethesda, MD (US)

(72) Inventors: Mark A. Friesel, Ewing, NJ (US); Paul Mountcastle, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 219 days.

(21) Appl. No.: 13/779,398

(22) Filed: Feb. 27, 2013

(51) Int. Cl.
| | |
|---|---|
| *G01S 13/58* | (2006.01) |
| *G01S 13/66* | (2006.01) |
| *G01S 13/89* | (2006.01) |
| *G01S 13/72* | (2006.01) |
| *G01S 13/00* | (2006.01) |

(52) U.S. Cl.
CPC .............. *G01S 13/581* (2013.01); *G01S 13/66* (2013.01); *G01S 13/726* (2013.01); *G01S 13/89* (2013.01)

(58) Field of Classification Search
CPC ......... G01S 13/02; G01S 13/04; G01S 13/06; G01S 13/08; G01S 13/42; G01S 13/422; G01S 13/428; G01S 13/52; G01S 13/58; G01S 13/589; G01S 13/62; G01S 13/64; G01S 13/66; G01S 13/68; G01S 13/685; G01S 13/70; G01S 13/72; G01S 13/723; G01S 13/726; G01S 13/88; G01S 13/89; G01S 13/90; G01S 17/003; G01S 17/02; G01S 17/026; G01S 17/06; G01S 17/08; G01S 17/42; G01S 17/50; G01S 17/58; G01S 17/66; G01S 13/581; G91S 13/50
USPC .......... 342/25 R–25 F, 52–54, 61–66, 73–82, 342/89–115, 118, 134–158, 175, 176, 179, 342/192–197; 89/1.11; 382/100, 103; 244/3.1, 3.15–3.19
See application file for complete search history.

(56) References Cited

U.S. PATENT DOCUMENTS

| | | | | |
|---|---|---|---|---|
| 3,724,783 | A * | 4/1973 | Nolan et al. | 244/3.15 |
| 3,982,713 | A * | 9/1976 | Martin | 244/3.1 |
| 4,128,837 | A * | 12/1978 | Page | 342/106 |
| 4,138,677 | A * | 2/1979 | Sinclair, Jr. | 342/106 |
| 4,308,538 | A * | 12/1981 | Albersheim | 342/80 |

(Continued)

OTHER PUBLICATIONS

Paul D. Mountcastle, Nathan A. Goodman, and Charles J. Morgan, "Generalized Adaptive Radar Signal Processing", Technology Service Corporation Trumbull, CT, 06611; ECE Dept., University of Arizona, Tucson, AZ, 85721, US Army Space and Missile Defense Command and the Missile Defense Agency under STTR contract HQ0006-07-C-7661, Dec. 2008.

(Continued)

*Primary Examiner* — Bernarr Gregory
(74) *Attorney, Agent, or Firm* — Howard IP Law Group, PC (57) ABSTRACT

A method for identification of one or more launched objects obscured by debris objects within a debris field comprises: directing one or more sensor pulses at the debris field to obtain a plurality of sensor images; identifying objects within the debris field based on the sensor images; determining acceleration characteristics for each of the identified objects within the debris field based on the sensor images; identifying objects exhibiting free fall acceleration characteristics as debris objects; and identifying objects exhibiting centripetal acceleration characteristics as the one or more launched objects.

20 Claims, 7 Drawing Sheets

(56) References Cited

U.S. PATENT DOCUMENTS

| | | | |
|---|---|---|---|
| 4,817,495 A * | 4/1989 | Drobot | 89/1.11 |
| 5,311,189 A * | 5/1994 | Nagel | 342/95 |
| 5,341,142 A * | 8/1994 | Reis et al. | 244/3.15 |
| 5,341,143 A * | 8/1994 | Reis et al. | 244/3.15 |
| 5,381,156 A * | 1/1995 | Bock et al. | 342/99 |
| 5,400,033 A * | 3/1995 | Hablani | 342/95 |
| 5,501,413 A * | 3/1996 | Kilger et al. | 244/3.15 |
| 5,631,654 A * | 5/1997 | Karr | 342/107 |
| 5,710,423 A * | 1/1998 | Biven et al. | 244/3.1 |
| 5,748,140 A * | 5/1998 | Schober | 342/90 |
| 5,798,942 A * | 8/1998 | Danchick et al. | 342/96 |
| 5,842,156 A * | 11/1998 | Hong et al. | 342/118 |
| 5,909,189 A * | 6/1999 | Blackman et al. | 342/90 |
| 5,960,097 A | 9/1999 | Pfeiffer et al. | |
| 6,043,867 A * | 3/2000 | Saban | 244/3.17 |
| 6,262,680 B1 * | 7/2001 | Muto | 342/74 |
| 6,278,401 B1 * | 8/2001 | Wigren | 342/195 |
| 6,313,785 B1 * | 11/2001 | Mattox | 342/106 |
| 6,437,729 B1 * | 8/2002 | Mattox | 342/106 |
| 6,697,010 B1 * | 2/2004 | Lam | 342/25 R |
| 6,704,692 B1 * | 3/2004 | Banerjee et al. | 342/96 |
| 6,877,691 B2 * | 4/2005 | DeFlumere et al. | 244/3.15 |
| 6,995,705 B2 | 2/2006 | Bradford et al. | |
| 7,032,858 B2 * | 4/2006 | Williams | 342/175 |
| 7,046,188 B2 | 5/2006 | Zaugg et al. | |
| 7,236,121 B2 * | 6/2007 | Caber | 342/62 |
| 7,295,149 B1 | 11/2007 | Wolf | |
| 7,333,047 B2 | 2/2008 | Fullerton et al. | |
| 7,394,046 B2 * | 7/2008 | Olsson et al. | 342/175 |
| 7,394,047 B1 * | 7/2008 | Pedersen | 342/175 |
| 7,411,543 B1 * | 8/2008 | Boka | 342/90 |
| 7,473,876 B1 * | 1/2009 | Pedersen et al. | 342/175 |
| 7,511,252 B1 | 3/2009 | Pedersen et al. | |
| 7,548,194 B2 * | 6/2009 | Wood | 342/195 |
| 7,551,121 B1 * | 6/2009 | O'Connell et al. | 342/195 |
| 7,552,669 B1 * | 6/2009 | Denis et al. | 89/1.11 |
| 7,692,573 B1 * | 4/2010 | Funk | 342/90 |
| 7,755,011 B2 | 7/2010 | Lam et al. | |
| 7,875,837 B1 * | 1/2011 | Szabo et al. | 342/195 |
| 7,924,213 B2 | 4/2011 | De Waard et al. | |
| 8,063,347 B1 * | 11/2011 | Urbano et al. | 342/195 |
| 8,115,148 B1 * | 2/2012 | Boardman et al. | 342/195 |
| 8,138,965 B1 * | 3/2012 | Luu et al. | 342/90 |
| 8,229,163 B2 | 7/2012 | Coleman et al. | |
| 8,358,238 B1 * | 1/2013 | Friedman | 89/1.11 |
| 8,378,880 B1 * | 2/2013 | Boka et al. | 342/53 |
| 8,674,276 B2 * | 3/2014 | Rovinsky | 89/1.11 |
| 2009/0087029 A1 | 4/2009 | Coleman et al. | |

OTHER PUBLICATIONS

Kelly, E. J., "The Radar Measurement of Range, Velocity and Acceleration", IRE Transactions of Military Electronics, pp. 51-57, Apr. 1961.

\* cited by examiner

BALLISTIC MISSILE DEBRIS MITIGATION

FIELD OF THE INVENTION

The present invention relates to ballistic missile analysis and more particularly to a method and system for identifying a ballistic missile within debris.

BACKGROUND OF THE INVENTION

Present radar for Ballistic Missile Defense signal processing and data representation is capable of producing a picture of debris (small fragments of irregular shape and mass) as a dense field of closely spaced objects. However it is difficult to separate the lethal object (e.g. a ballistic missile) from the field of debris. Debris encompasses certain types of objects in a ballistic missile threat complex, whether intentional or unintentional in origin, that complicate discrimination of the lethal object by presenting a field of closely-spaced fragments that are physically small and non-symmetric in shape and radar pattern, and execute non-simple rotational motion. Examples of debris are the fragments of spent fuel released during solid rocket termination, and the bi-products of intentional fragmentation (explosion) of a final stage booster tank.

A number of methods have been used to remove debris indications. A common method is to form a track on the debris as well as on the objects of interest. Then discrimination of the debris from the lethal object is performed by identifying the object(s) of interest based on long-term behavioral characteristics, such as by using a Bayes network. This method uses an enormous amount of radar resources to track the debris and the object(s) of interest. Another method used is to filter the debris and the object based on their radar cross-section (RCS). However, in challenging cases, the RCS of the threatening object may be smaller than many or most of the detected debris fragments, rendering bulk filtering based on RCS ineffective.

Also, because existing techniques may require tracking of the debris or otherwise require long processing times to discriminate the debris from the object(s) of interest, the distribution of deployment velocities for the debris fragments may be such that they continue to complicate the radar scene throughout the exoatmospheric phase of flight, before finally being stripped away during the endoatmospheric re-entry phase. Accordingly, it is desirable to screen out early in the engagement a potentially large numbers of debris objects, with few missed detections of the lethal object (low leakage), in order to concentrate focus of attention and expend radar resources on potentially threatening principal objects. The need to accomplish this screening is particularly critical in the case of a future tactical sea-based radar operating against short- and medium-range ballistic missile threats in the naval theatre. If debris generated in the exoatmosphere is not handled early, the terminal re-entry phase becomes the one opportunity to perform discrimination, and this may be too late.

Thus, a rapid and accurate method and system to distinguish debris from objects of interest is needed.

SUMMARY OF THE INVENTION

The approach uses an observable acceleration characteristic to perform a quick and accurate discrimination between missile debris and the missile.

A method for identification of one or more launched objects obscured by debris objects within a debris field is disclosed. The method may comprise: directing one or more sensor pulses at the debris field to obtain a plurality of sensor images; identifying objects within the debris field based on the plurality of sensor images; determining acceleration characteristics for each of the identified objects within the debris field based on the plurality of sensor images; designating objects exhibiting free fall acceleration characteristics as the debris objects; and designating objects exhibiting centripetal acceleration characteristics as the one or more launched objects. In an embodiment, the plurality of sensor images may comprise range-velocity images. In an embodiment, the method may further comprise generating a range-velocity-acceleration image from the range-velocity images. Determining acceleration characteristics of each of the identified objects may comprise determining the acceleration characteristics of each of the identified objects from the range-velocity-acceleration image. The method may further comprise generating a filtered range-velocity-acceleration image of the designated one or more launched objects within the debris field by filtering out the designated debris objects from the range-velocity-acceleration image. In an embodiment, the method may also comprise generating filtered sensor images of the designated one or more launched objects within the debris field by filtering out the designated debris objects from each of the plurality of sensor images. The method may also comprise tracking the designated one or more launched objects with one or more additional sensor pulses. In an embodiment, the one or more sensor pulses may be included in a single dwell from a sensor.

A method for identification of one or more launched objects obscured by debris within a debris field may comprise: directing one or more sensor pulses at the debris field to obtain a plurality of range-velocity sensor images; generating a range-velocity-acceleration image from the plurality of range-velocity sensor images; identifying objects on the range-velocity-acceleration image exhibiting free-fall acceleration as debris objects; filtering the debris objects from the range-velocity-acceleration image, thereby revealing one or more possible launched objects on the filtered range-velocity-acceleration image. The method may further comprise determining which of the one or more possible launched objects exhibit centripetal acceleration; and identifying the one or more possible launched objects exhibiting centripetal acceleration as launched objects. In an embodiment, the method may further comprise generating a filtered range-velocity-acceleration image of the identified launched objects within the debris field by filtering out the identified debris objects from the range-velocity-acceleration image. The method may also further comprise generating filtered sensor images of the identified launched objects within the debris field by filtering out the designated debris objects from each of the plurality of sensor images. The method may also further comprise tracking the identified launched objects with one or more additional dwells including one or more additional sensor pulses. In an embodiment, the one or more sensor pulses may be included in a single dwell from a sensor.

A system for identifying one or more launched objects obscured by debris within a debris field may comprise: a sensor configured to direct one or more sensor pulses at the debris field to obtain a plurality of range-velocity sensor images; memory for storing the plurality of range-velocity images; and a processor configured to: cause the sensor to direct the one or more sensor pulses at the debris field to obtain the plurality of range-velocity sensor images; generate a range-velocity-acceleration image from the plurality of range-velocity sensor images; identify objects on the range-velocity-acceleration image exhibiting free-fall acceleration as debris objects; and identify objects on the range-velocityacceleration image exhibiting centripetal-acceleration as launched objects. In an embodiment, the processor may be further configured to generate a filtered range-velocity-acceleration image of the identified launched objects within the debris field by filtering out the identified debris objects from the range-velocity-acceleration image. The system may further comprise a display coupled to the processor, wherein the processor is further configured to cause the filtered range-velocity-acceleration image to be shown on the display. In an embodiment, the processor may be configured to cause the sensor to obtain the plurality of range-velocity sensor images from a single dwell including the one or more sensor pulses. The processor may also be further configured to cause the sensor to track the identified launched objects with one or more additional dwells including one or more additional sensor pulses. The system may also further comprise a communications network coupling the processor to an anti-missile defense system, wherein the processor is further configured to transmit tracking data relating to the designated launched objects to the anti-missile defense system via the communications network.

DETAILED DESCRIPTION

According to an aspect of the disclosure, a real-time debris discrimination system and method is disclosed. The debris discrimination system and method improve the discrimination of debris from a launched object or potential threat, and may allow the discrimination to be performed in a single dwell, thus freeing the sensor system from having to track each piece of debris until a discrimination is made.

Figure 1:
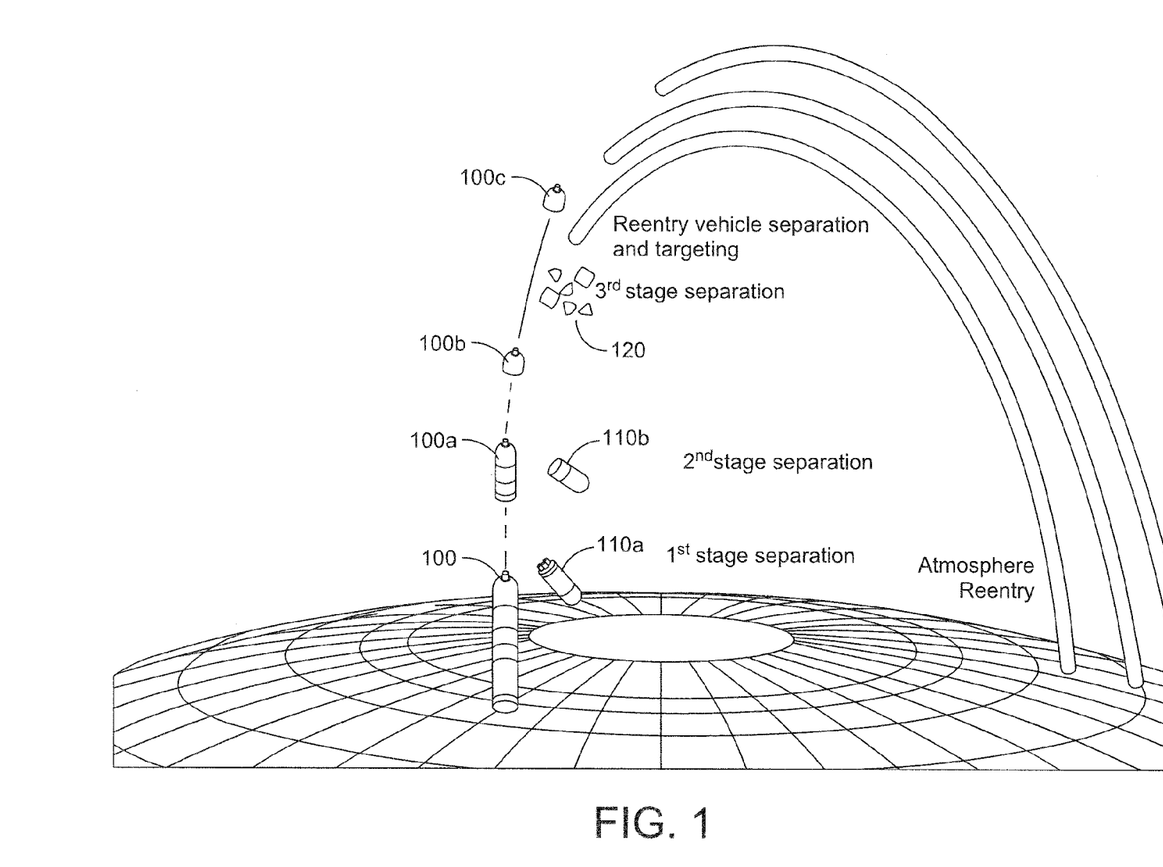
FIG. 1 is a notional representation of a launched object and its associated debris.

FIG. 1 is a notional representation of an exemplary launched object and its associated debris that may be sensed according to an embodiment of the disclosure. Launched object 100 is shown along with the various stages of its flight. Launched object 100a represents the launched object at the first stage separation when booster 110a becomes separated from the original object. Launched object 100b represents the launched object at the second stage separation when booster 110b becomes separated from the original object. Launched object 100c represents the launched object later in its flight, during which trajectory corrections may be made to alter the path of object. During the flight of launched object 100, intentional or unintentional debris 120 may present itself within the area of the launched object. Examples of the debris may include spent fuel released during solid rocket termination and the bi-products of intentional fragmentation (explosion) of a final stage booster tank. As will be understood, the debris may by closely-spaced fragments that are physically small and non-symmetric in shape and radar pattern, and may also exhibit non-simple rotational motion. A potentially large number of debris objects may be present and these debris objects complicate the radar or sensor scene through the exoatmospheric phase of flight during which anti-missile activities are desirable. The debris may be stripped away during the endoatmospheric re-entry phase, however at that point it may be too late to engage the threat.

Figure 2:
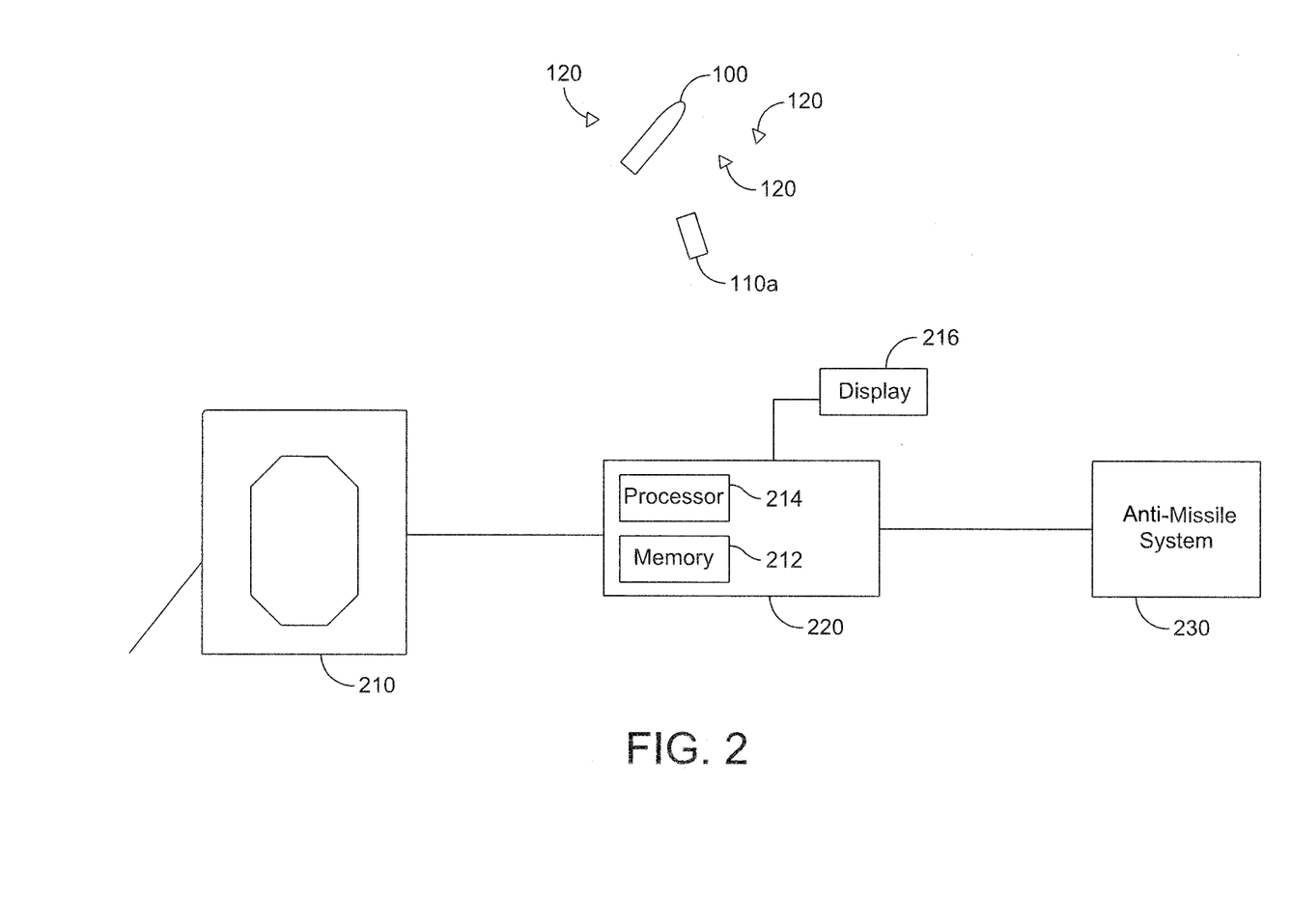
FIG. 2 is a simplified block diagram illustrating a system including an object sensing and discrimination arrangement and a threat engagement arrangement reliant on the discrimination arrangement.

FIG. 2 is a simplified block diagram illustrating a system including an object sensing block, a discrimination block, and a threat engagement block. Sensor 210 may be a radar or other type of sensor such as an IR sensor. A discrimination processing block 220 may be used to process the information (e.g. data) sensed by sensor 210, and a network or other communications connection is used to transfer the sensor information to the discrimination processing block 220. The processing block may include memory 212, one or more processors 214, and a display 216. An threat engagement or anti-missile system 230 may be communicatively connected to the processing block 220 via a network or other communications connection so that the processing block 220 may transfer information concerning the location of the launched object, as determined after filtering out the debris, to the anti-missile system 230.

Figure 3:
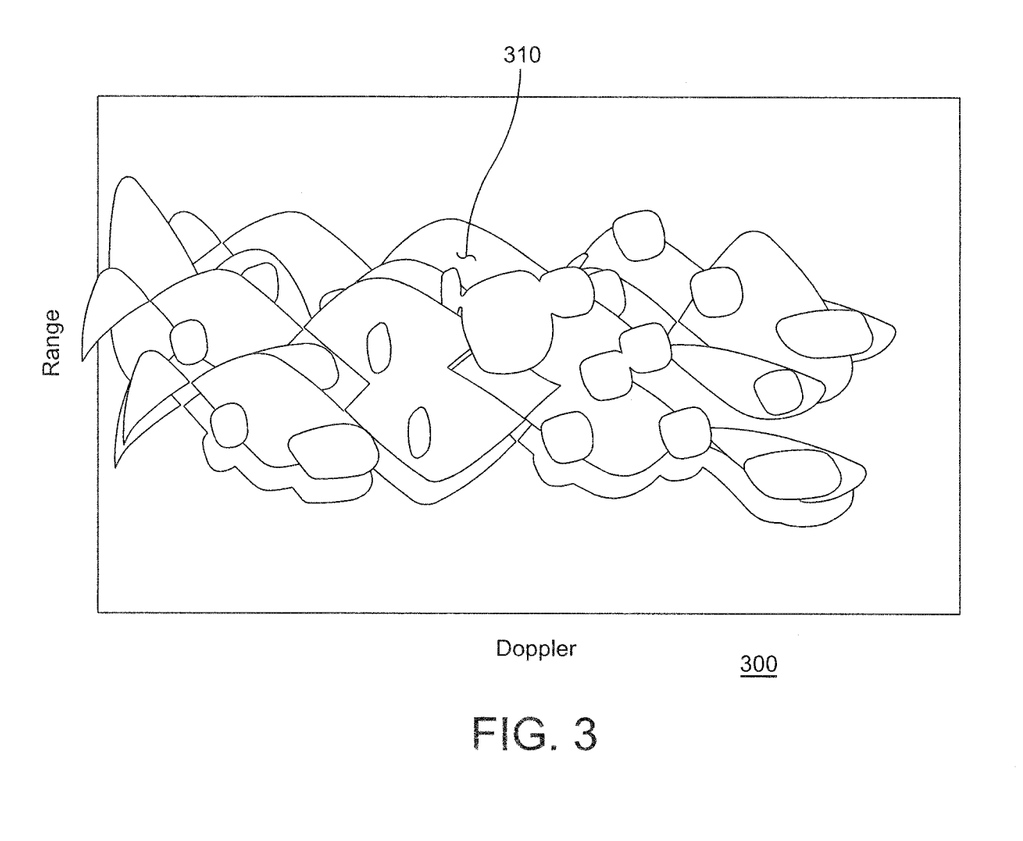
FIG. 3 is a range velocity image that may be observed by a sensor according to an embodiment of the invention.

FIG. 3 is a range velocity image 300 that may be observed by a sensor according to an embodiment of the invention. The range velocity image of FIG. 3 is an example of what may be observed in the current state of the art in radar. The contours 310 on the range velocity image 300 may represent debris and tumbling object(s). However, as shown on FIG. 3, the range velocity image alone does not provide information that discriminates the debris from the tumbling object(s). The current generation of signal processing models are based on naïve models and the objects on the radar are considered in a vacuum and all the point scatters move along straight lines throughout the coherent dwell. This is the basis for existing radar processing such as SAR (Synthetic Aperture Radar), ISAR (Inverse Synthetic Aperture Radar), STAP (Space-time Adaptive Processing), Doppler filtering, adaptive doppler filtering, and pulse compression. A "point scatterer at range R" model can be used to model objects in a debris field and the radar cross section (RCS) can be used to determine how plausible the model is. A "true point scatterer at range R" model can provide I&Q (In-Phase and Quadrature) as a function of wideband frequencies for a finite number of frequencies, for a signal of finite bandwidth B and finite time T. For pulse compression, coded CW (continuous wave), or an LFM (linear frequency modulated) chirp can be used. The frequencies are sent out and then received on return, and a transfer function may be used to represent the amplitude change and the phase shift in complex polar form. For each wideband frequency in the transmission, there is a transfer function Z, and the radar data may be Z. In a "several point scatterers at distances r" model, the phase (phi) for a scatterer at distance r is $$\text{phi} = 4 * \text{pi} * f * r/c$$

where:
pi is $\pi$;
f is the frequency of the signal;
r is the range of the scatterer; and
c is the velocity of propagation.

For all of the scatterers, all of data may be used and summed:

$$\text{Sum}\{f\} Z * \exp(-\text{phi}).$$

At every r the plausibility (RCS) may be checked. The phase of the measured data may be corrected according to the phase model and then the data maybe added up. The absolute square may be considered the RCS. In a "point moving at radial velocity v" model, the phase model has an extra term:

phi(x,v)=4*pi*f*(x+vt)/c where
x is range;
v is velocity;
pi is π;
f is the frequency of the signal;
t is time; and
c is the velocity of propagation
which can be used to form a range-Doppler image.

Figure 4:
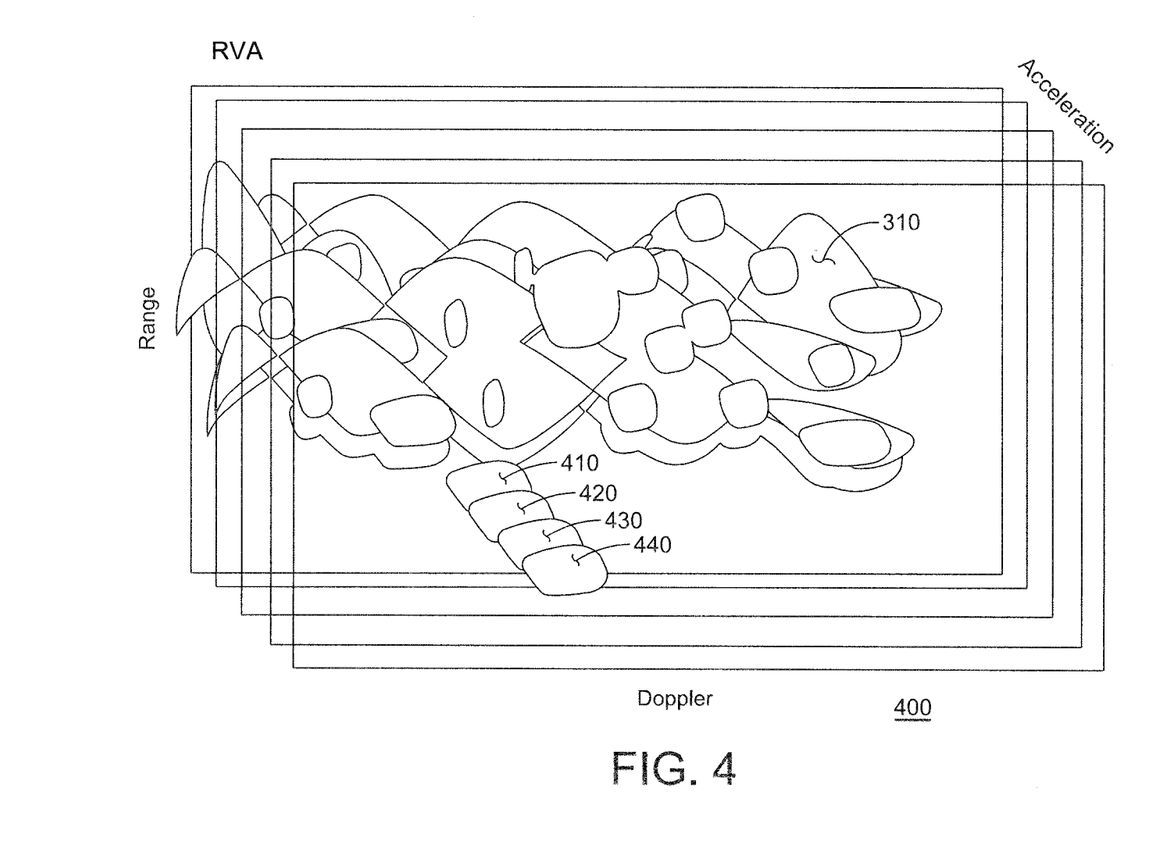
FIG. 4 is a range-velocity-acceleration image that may be generated from range velocity images according to an embodiment of the invention.

FIG. 4 is a range-velocity-acceleration image 400 that may be generated from range velocity images according to an embodiment of the invention. As shown, FIG. 4 includes contours 310 as shown in FIG. 3, which may represent debris and/or tumbling objects. However, because FIG. 4 also includes an acceleration axis, objects that display centripetal acceleration can be observed, such as objects 410, 420, 430, and 440. Objects 410-440 may represent any tumbling object that exhibits centripetal acceleration, such as the lethal object, a spent final stage fuel tank, a post-boost vehicle, or an attitude control motor (ACM) for the missile. As discussed, existing signal processing is based on naïve models. According to an embodiment of the present invention, an acceleration term may be included in the signal processing models and then used to generate a range-velocity acceleration image RVA.

r=x+vt+0.5at² where:
r is the range;
x is the initial range of the object;
v is the velocity;
t is time; and
a is acceleration.

In general, a radar signal processing model could be any parametric model with some parameters, i.e., phi(f,t|q), where f is frequency, t is time, and q is the quadrature. In an example, a simplified parametric model can be represented by phi(f|r), where f is frequency and r is range. In a less simplified model, the parametric model can be represented by phi (f,t|x,v), where f is frequency, t is time, x is range, and v is velocity. An image may be formed in space consisting of all of the parameters of the model:

PHI=sum{f,t}Z(f,t)exp(-i phi(f,t|q))

Image(q)=PHI*PHI

The acceleration term may be incorporated into the parametric model. In an example, the scatterer is modeled as a point with constant velocity and constant acceleration throughout the coherent processing interval (CPI):

$$\phi(f, t \mid r, v, a) = \frac{4\pi f}{c}\left(r - vt - \frac{1}{2}at^2\right)$$

$$I(r, v, a) = \langle r, v, a \mid r, v, a \rangle$$

$$= \left|\sum_f \sum_t w(f, t)Z(f, t)e^{\frac{4\pi f}{c}\left(r-vt-\frac{1}{2}at^2\right)}\right|^2$$

$$\langle f, t \mid r, v, a \rangle = Z(f, t)e^{\frac{4\pi f}{c}\left(r-vt-\frac{1}{2}at^2\right)}$$

The approach places observations in range, Doppler, acceleration space. Constant acceleration objects occupy a plane or narrow slab with normal parallel to the acceleration axis (in the far-field) at the component of gravitational acceleration parallel to the radar range vector. Doppler, correlated behavior, and acceleration characteristics (i.e. out-of plane accelerations), can allow separation of debris and objects of interest in the attribute space. Subsequent weighting allows debris characteristics to be placed at a null in the power spectrum, thus minimizing debris indications, while maximizing non-debris power.

Figure 5:
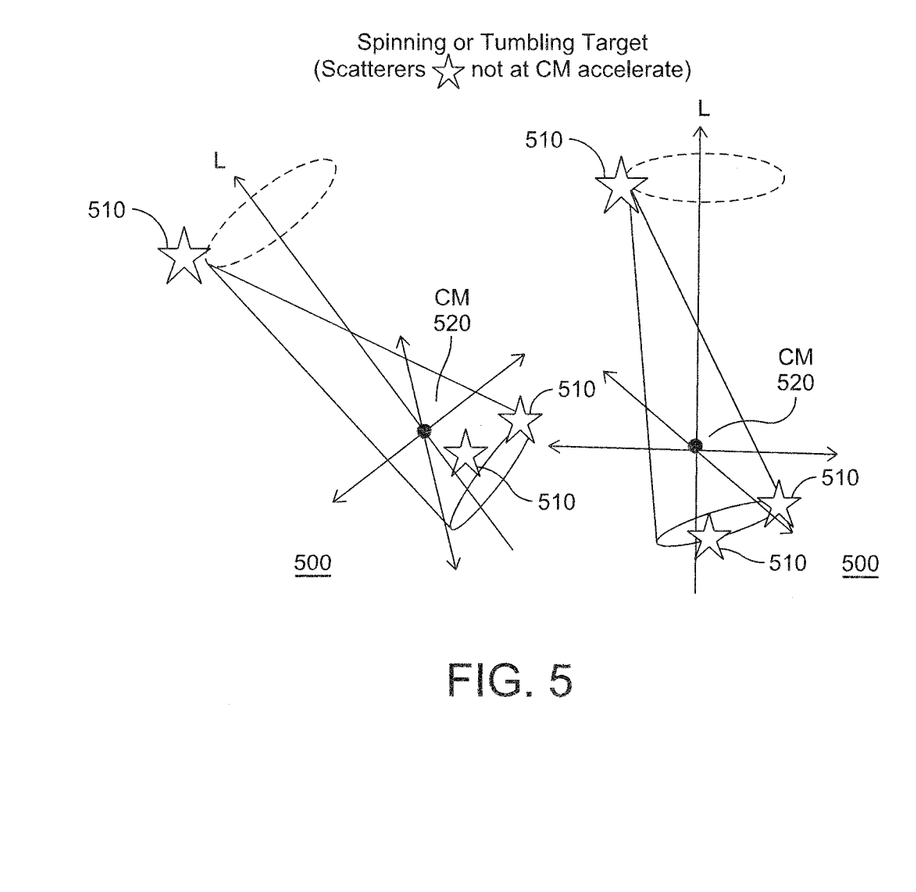
FIG. 5 is a notional depiction of a spinning or tumbling target.

In an example, an l(r,v,a) image is generated depicting many exoatmospheric objects or particles and a target (e.g., a launched object) that is tumbling or in spin-precession embedded in the cloud formed by the objects and particles. FIG. 5 is a notional depiction of a spinning or tumbling target 500, in which the scatterers 510 are shown by a star symbol and the center of mass 520 is shown by CM. As shown, the scatterers at the tip and at the base of the target and not at the center of mass are subject to forces of rigid body constraint, that is, centripetal acceleration. Thus, the tip and base scatterers of the target do not move like free-falling particles. If the free fall objects or particles that do move like free-falling particles are filtered out, the tumbling object may be revealed.

Figure 6:
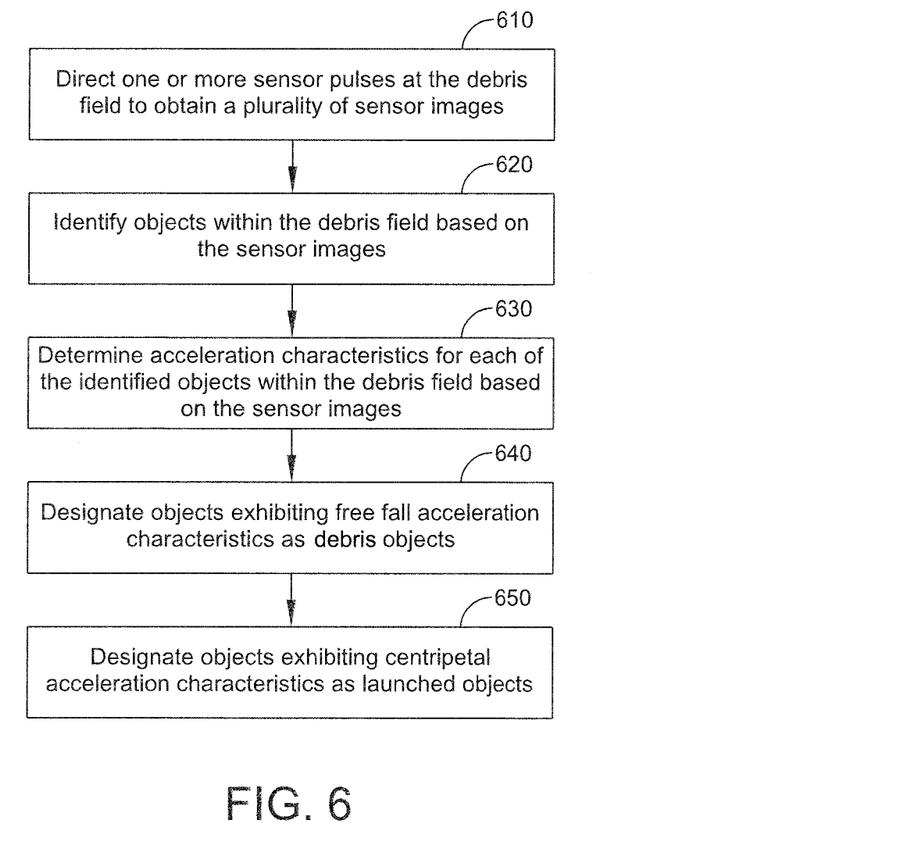
FIG. 6 is a simplified logic flow chart or diagram illustrating processing steps according to aspects of the disclosure.

FIG. 6 is a simplified logic flow chart or diagram illustrating processing steps according to aspects of the disclosure. At block 610, one or more sensor pulses are directed at a debris field to obtain a plurality of sensor images. In an embodiment, the plurality of sensor images may comprise range-velocity images. It is understood that the sensor pulses are pulses of electromagnetic energy (e.g. radar pulses). At block 620, objects within the debris field are identified based on the sensor images. At block 630, acceleration characteristics for each of the identified objects within the debris field is determined based on the sensor images. At block 640, identified objects that exhibit free fall acceleration characteristics are designated to be debris objects. At block 650, identified objects that exhibit centripetal acceleration characteristics as designated to be launched objects. In an embodiment, the method may also include generating a range-velocity-acceleration image from said range-velocity images. In addition, determining acceleration characteristics of each of the objects may comprise determining the acceleration characteristics of each of the objects from the range-velocity-acceleration image.

In an embodiment, the method may further comprise generating a filtered range-velocity-acceleration image of the designated launched objects within the debris field by filtering out the designated debris objects from the range-velocity-acceleration image. In another embodiment, it may be desirable to view the launched objects on each of the plurality of sensor images, which may be accomplished by filtering the debris objects from each of the plurality of sensor images, after the debris objects have been identified in the RVA image.

In an embodiment, the method may also comprise tracking the designated launched objects with one or more additional sensor pulses. As will be understood, once the launched objects are identified amongst the debris, the radar resources may be used to direct additional sensor pulses to track the launched objects, perhaps so that tracking data may then be sent to an anti-missile system that will engage the launched object. In an embodiment, the initial one or more sensor pulses that are used to obtain the plurality of range velocity images are included in a single dwell from the sensor. This embodiment essentially allows the launched object to be discriminated from the debris in a single dwell, which may save an enormous amount of radar resources over the traditional discrimination methods that require tracking of each piece of debris over multiple dwells until each piece of debris is classified.

Figure 7:
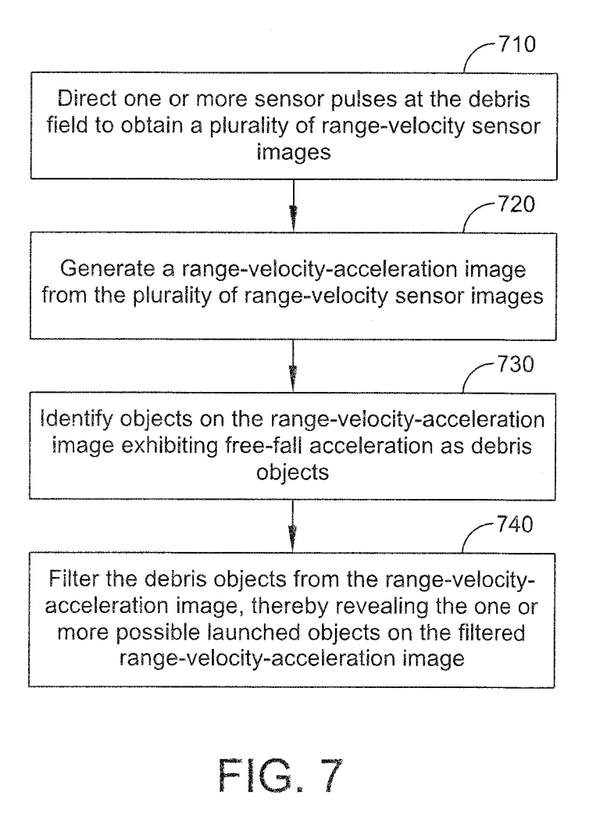
FIG. 7 is a notional depiction of a spinning or tumbling target.

FIG. 7 is a simplified logic flow chart or diagram illustrating processing steps according to aspects of the disclosure. This embodiment is similar to the embodiment of FIG. 6 except that the "possible" launched objects are initially identified by filtering out the debris, and then later the possible launched objects may be confirmed by actually checking the acceleration characteristics of each of the possible launched objects. At block 710, one or more sensor pulses are directed at the debris field to obtain a plurality of range-velocity sensor images. At block 720, a range-velocity-acceleration image is generated from the plurality of range-velocity sensor images. At block 730, objects on the range-velocity-acceleration image exhibiting free-fall acceleration are identified as being debris objects. At block 740, the debris objects are filtered from the range-velocity-acceleration image, thereby revealing the one or more possible launched objects on the filtered range-velocity-acceleration image. As noted, the method may also include identifying the possible launched objects exhibiting centripetal acceleration as launched objects. That is, only those possible launched objects that exhibit centripetal acceleration are considered actual launched objects.

In an embodiment, the method may further comprise generating a filtered range-velocity-acceleration image of the (actual) launched objects within the debris field by filtering out the designated debris objects from the range-velocity-acceleration image. In another embodiment, it may be desirable to view the launched objects on each of the plurality of sensor images, which may be accomplished by filtering the debris objects from each of the plurality of sensor images, after the debris objects have been identified in the RVA image.

In an embodiment, the method may also comprise tracking the designated launched objects with one or more additional sensor pulses. As will be understood, once the launched objects are identified amongst the debris, the radar resources may be used to direct additional sensor pulses to track the launched objects, perhaps so that tracking data may then be sent to a anti-missile system that will engage the launched object. In an embodiment, the initial one or more sensor pulses that are used to obtain the plurality of range velocity images are included in a single dwell from the sensor. This embodiment essentially allows the launched object to be discriminated from the debris in a single dwell, which may save an enormous amount of radar resources over the traditional discrimination methods that require tracking of each piece of debris over multiple dwells until each piece of debris is classified.

The disclosed method described herein may be automated by, for example, tangibly embodying a program of instructions upon a computer readable storage media capable of being read by machine capable of executing the instructions. A general purpose computer is one example of such a machine, as are other known computing devices having processors, memory, hardware, software, and/or firmware. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process blocks herein may be performed automatically or wholly or partially in response to user command. An activity (including a step) performed automatically is performed in response to executable instruction or device operation without user direct initiation of the activity.

The systems and processes of FIGS. 1-7 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 2. Further, any of the functions and blocks provided in FIGS. 6 and 7 may be implemented in hardware, software or a combination of both and may reside on one or more processing devices located at any location of a network linking the elements of FIG. 2 or another linked network, including the Internet.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for identification of one or more launched objects obscured by debris objects within a debris field, the method comprising:
    directing, by a sensor at the direction of a computer processor, one or more sensor pulses at the debris field to obtain a plurality of sensor images;
    identifying, by the computer processor, objects within the debris field based on the plurality of sensor images;
    determining, by the computer processor, acceleration characteristics for each of the identified objects within the debris field based on the plurality of sensor images;
    identifying, by the computer processor, objects exhibiting free fall acceleration characteristics as the debris objects; and
    identifying, by the computer processor, objects exhibiting centripetal acceleration characteristics as the one or more launched objects.

2. The method of claim 1, wherein the plurality of sensor images comprise range-velocity images.

3. The method of claim 2, further comprising generating, by the computer processor, a range-velocity-acceleration image from said range-velocity images.

4. The method of claim 3, wherein determining acceleration characteristics of each of the identified objects comprises determining the acceleration characteristics of each of the identified objects from the range-velocity-acceleration image.

5. The method of claim 4, further comprising generating, by the computer processor, a filtered range-velocity-acceleration image of the identified one or more launched objects within the debris field by filtering out the identified debris objects from the range-velocity-acceleration image.

6. The method of claim 4, further comprising generating, by the computer processor, filtered sensor images of the identified one or more launched objects within the debris field by filtering out the identified debris objects from each of the plurality of sensor images.

7. The method of claim 4, further comprising tracking, by the computer processor, the identified one or more launched objects with one or more additional sensor pulses.

8. The method of claim 1, wherein the one or more sensor pulses are included in a single dwell from a sensor.

9. A method for identification of one or more launched objects obscured by debris within a debris field comprising:
 directing, by a sensor at the direction of a computer processor, one or more sensor pulses at the debris field to obtain a plurality of range-velocity sensor images;
 generating, by the computer processor, a range-velocity-acceleration image from the plurality of range-velocity sensor images;
 identifying, by the computer processor, objects on the range-velocity-acceleration image exhibiting free-fall acceleration as debris objects;
 filtering, by the computer processor, the debris objects from the range-velocity-acceleration image, thereby revealing one or more possible launched objects on the filtered range-velocity-acceleration image.

10. The method of claim 9, further comprising
 determining, by the computer processor, which of the one or more possible launched objects exhibit centripetal acceleration; and
 identifying, by the computer processor, the one or more possible launched objects exhibiting centripetal acceleration as launched objects.

11. The method of claim 10, further comprising generating, by the computer processor, a filtered range-velocity-acceleration image of the identified launched objects within the debris field by filtering out the identified debris objects from the range-velocity-acceleration image.

12. The method of claim 10, further comprising generating, by the computer processor, filtered sensor images of the identified launched objects within the debris field by filtering out the identified debris objects from each of the plurality of sensor images.

13. The method of claim 10, further comprising tracking, by the computer processor, the identified launched objects with one or more additional dwells including one or more additional sensor pulses.

14. The method of claim 9, wherein the one or more sensor pulses are included in a single dwell from a sensor.

15. A system for identifying one or more launched objects obscured by debris within a debris field, the system comprising:
 a sensor configured to direct one or more sensor pulses at the debris field to obtain a plurality of range-velocity sensor images;
 memory for storing the plurality of range-velocity images; and
 a processor configured to:
  cause the sensor to direct the one or more sensor pulses at the debris field to obtain the plurality of range-velocity sensor images;
  generate a range-velocity-acceleration image from the plurality of range-velocity sensor images;
  identify objects on the range-velocity-acceleration image exhibiting free-fall acceleration as debris objects; and
  identify objects on the range-velocity-acceleration image exhibiting centripetal-acceleration as launched objects.

16. The system of claim 15, wherein the processor is further configured to generate a filtered range-velocity-acceleration image of the identified launched objects within the debris field by filtering out the identified debris objects from the range-velocity-acceleration image.

17. The system of claim 16, further comprising a display coupled to the processor, wherein the processor is further configured to cause the filtered range-velocity-acceleration image to be shown on the display.

18. The system of claim 17, further comprising a communications network coupling the processor to an anti-missile defense system, wherein said processor is further configured to transmit tracking data relating to the identified launched objects to the anti-missile defense system via the communications network.

19. The system of claim 15, wherein the processor is configured to cause the sensor to obtain the plurality of range-velocity sensor images from a single dwell including the one or more sensor pulses.

20. The system of claim 15, wherein the processor is further configured to cause the sensor to track the identified launched objects with one or more additional dwells including one or more additional sensor pulses.

* * * * *